UNITED STATES PATENT OFFICE

PAUL R. SCHREURS, OF MUSCATINE, IOWA

METHOD OF COLOR COATING GRAVEL

No Drawing. Application filed November 28, 1928. Serial No. 322,591.

This invention is a novel product and method of making the same. The product is especially designed for use in making so-called "stucco" and "pebble-dash" in building construction, and for other purposes in the arts, as will be evident when the invention is known.

The object of the invention is to produce colored pebbles in quantities of any desired color; which color will be permanent and uniform over the surface of the pebbles, and which will be water-proof; so that such colored pebbles can be used on the exterior surfaces of buildings, in pebble-dash or stucco work, and also used for interior decorative purposes; and may also be used in aquariums and the like.

The invention consists in the novel method of coloring pebbles as hereinafter described, and in the resulting product, and to enable others to use the invention, I will first explain the preferred method of making the product and then summarize in the claims the invention for which protection is desired.

While the invention is particularly intended and designed for coating natural pebbles and gravel, the method may be applied to coating other small objects which may be suitable or adaptable for like purposes, and by the word pebbles I intend to include equivalent or similar objects.

One method of carrying out the invention is as follows:

The pebbles are first separated or graded into sizes of from say ¼ inch to 1 inch in diameter. They are then washed and cleaned, preferably by placing them in a rotatable churn or barrel containing a caustic solution of lye or washing powder in water to cleanse the pebbles of all adhering dirt and foreign matter. Then the cleaned pebbles are dried.

The dry clean pebbles are then placed in a suitable rotatable tumbler or barrel and while they are agitated therein, a suitable water-proof coloring substance, such as Duco, lacquer, or enamel, is sprayed thereon until they are thoroughly coated and colored on all surfaces. The spraying is then stopped but the agitation is preferably continued until the coating on the pebbles is thoroughly dry and hard.

It is possible by using suitable lacquers to color the pebbles gold or silver.

If an enamel is used, then, after the pebbles have been coated as described, heated air is passed through the mass of coated pebbles while they are agitated, and the temperature of the air is gradually raised to a point, approximately 250° F. or more, sufficient to thoroughly bake the enamel coating upon the pebbles the temperature used depending upon the colors and nature of the enamel used; as some require higher temperatures to bake than others.

When Duco paint or lacquer is used it is not necessary to thus heat the pebbles, but the drying thereof can be facilitated by blowing dry warm air through the mass of coated pebbles while in agitation.

By the aforesaid methods the pebbles gravel and like objects can be thoroughly covered with a practically permanent water proof coating of any desired color.

The resulting product—water-proof colored coated pebbles—can be used for making colored stucco or pebble-dash on the exterior of buildings; and for ornamental and decorative work on the interiors; and many other useful purposes in the art.

I claim:—

1. The herein described method of coloring and water-proofing pebbles; consisting in first washing the pebbles in a caustic aqueous solution and drying same; agitating the pebbles in a revolving container and spraying a water-proof coloring substance thereon until the pebbles are thoroughly coated; then stopping the spraying; and drying the coated pebbles while agitated by the action of air currents.

2. The herein described method of coloring and water proofing pebbles, consisting in first washing the pebbles and drying them; agitating the dried pebbles in a container and simultaneously subjecting them to a spray of enamel until the pebbles are thoroughly coated; stopping the spray; agitating the coated pebbles while subjecting same to the action of air heated to a point sufficient to bake the enamel; and finally cooling the coated pebbles.

3. The herein described method of coloring and water-proofing pebbles consisting in first washing the pebbles in a caustic aqueous solution and drying the same; agitating the pebbles in a revolving container and subjecting them while agitated to a spray of a colored enamel until the same are thoroughly coated with the enamel; stopping the spray and agitating the coated pebbles and simultaneously passing through the mass currents of air heated to a point sufficient to bake the enamel; and finally cooling the coated pebbles.

PAUL R. SCHREURS.